United States Patent [19]

Ostermayer et al.

[11] Patent Number: 5,059,645
[45] Date of Patent: Oct. 22, 1991

[54] THERMOPLASTIC MOLDING MATERIALS BASED ON POLYPHENYLENE ETHERS

[75] Inventors: Bertram Ostermayer, Roedersheim-Gronau; Erhard Seiler, Ludwigshafen; Daniel Wagner, Bad Duerkheim; Klaus Bronstert, Carlsberg; Volker Ladenberger, Schwetzingen, all of Fed. Rep. of Germany

[73] Assignee: BASF Aktiengesellschaft, Ludwigshafen, Fed. Rep. of Germany

[21] Appl. No.: 525,201

[22] Filed: May 2, 1990

Related U.S. Application Data

[63] Continuation of Ser. No. 184,087, Apr. 20, 1988, abandoned.

[30] Foreign Application Priority Data

May 2, 1987 [DE] Fed. Rep. of Germany ....... 3714710

[51] Int. Cl.$^5$ .................... C08K 5/524; C08K 71/12
[52] U.S. Cl. .................... 524/128; 525/68; 525/92; 525/905
[58] Field of Search .................... 524/128; 525/92, 68, 525/905

[56] References Cited

U.S. PATENT DOCUMENTS

| | | |
|---|---|---|
| 3,639,508 | 2/1972 | Kambour . |
| 3,994,856 | 11/1976 | Katchman et al. . |
| 4,091,053 | 5/1978 | Kitchen . |
| 4,167,507 | 9/1979 | Haaf . |
| 4,252,913 | 2/1981 | Katchman et al. . |
| 4,309,514 | 1/1982 | Lee, Jr. . |
| 4,335,221 | 6/1982 | Gerberding . |
| 4,472,546 | 9/1984 | Sugro et al. ................ 524/128 |
| 4,563,500 | 1/1986 | Haaf et al. . |

FOREIGN PATENT DOCUMENTS

| | | |
|---|---|---|
| 0095098 | 5/1983 | European Pat. Off. . |
| 3035648 | 5/1982 | Fed. Rep. of Germany . |
| 2060656 | 5/1981 | United Kingdom . |
| 1532455 | 9/1982 | United Kingdom . |

Primary Examiner—Jacob Ziegler
Attorney, Agent, or Firm—Keil & Weinkauf

[57] ABSTRACT

Thermoplastic molding materials contain
  a) from 20 to 80 parts by weight of a polyphenylene ether,
  b) from 1 to 20 parts by weight of a block copolymer of the general formula A—B—A' consisting of two polyvinylaromatic blocks A and A' and a partially hydrogenated rubber block B,
  c) from 0 to 70 parts by weight of a polyvinylaromatic and
  d) from 0 to 40 parts by weight of conventional additives, the sum of a) to d) being 100 parts by weight, where
    the mean molecular weights of A and A' differ by a factor of from 2 to 20,
    the shorter block A has a mean molecular weight of from 2,000 to 4,000 and
    the blocks A and A' together account for from 35 to 50% by weight of b).

6 Claims, No Drawings

THERMOPLASTIC MOLDING MATERIALS BASED ON POLYPHENYLENE ETHERS

This application is a continuation of application Ser. No. 07/184,087, filed on Apr. 20, 1988 now abandoned.

The present invention relates to thermoplastic molding materials containing a) from 20 to 80 parts by weight of a polyphenylene ether,
b) from 1 to 20 parts by weight of a block copolymer of the general formula A-B-A', consisting of two polyvinylaromatic blocks A and A' and a partially hydrogenated rubber block B,
c) from 0 to 70 parts by weight of a polyvinylaromatic and
d) from 0 to 40 parts by weight of conventional additives, the sum of a) to d) being 100 parts by weight.

Thermoplastic materials which are suitable for the production of moldings and contain toughened styrene polymers and polyphenylene ethers are disclosed in, for example, U.S. Pat. Nos. 3,383,435, 4,128,602 and 4,128,603. Such molding materials are suitable for the production of moldings which possess better heat distortion resistance compared with toughened styrene polymers which have not been blended with polyphenylene ethers. The material properties of such molding materials are generally satisfactory, but we have found that the materials do not exhibit adequate flow behavior when they are very tough and do not possess satisfactory toughness when they have good flow behavior. In order further to increase the toughness, a number of publications, for example DE-A 20 00 118 and 22 55 930, DE-B 24 34 848 and DE-A 27 51 329, 30,38 551 and 30 43 893, therefore recommend that hydrogenated block copolymer rubbers of different compositions be added to the polyphenylene ethers and, if appropriate, styrene polymers.

In particular, DE-B 24 34 848 disclosed thermoplastic molding materials of polyphenylene ethers and a styrene polymer which are toughened with a block copolymer of the type A-B-A having a symmetrical structure. The blocks A of polymerized styrene have a mean molecular weight of from 4,000 to 115,000 and together account for not more than 33% by weight of the block copolymer. The partially hydrogenated block B of polymerized butadiene has a mean molecular weight of from 20,000 to 450,000 and contains less than 10% by weight of the double bonds originally present. However, these molding materials have some disadvantages. Because of their unsatisfactory flow, particularly in the case of high polyphenylene ether contents, they are difficult to process and also have an unsatisfactory impact strength which furthermore decreases sharply on prolonged heating.

It is an object of the present invention to provide molding materials which are based on polyphenylene ethers, are very tough and at the same time have good flow, are readily processible and have high heat stability.

We have found that this object is achieved by thermoplastic molding materials containing a) from 20 to 80 parts by weight of a polyphenylene ether,
b) from 1 to 20 parts by weight of a block copolymer of the general formula A-B-A', consisting of two polyvinylaromatic blocks A and A' and a partially hydrogenated rubber block B,
c) from 0 to 70 parts by weight of a polyvinylaromatic and
d) from 0 to 40 parts by weight of conventional additives, the sum of a) to d) being 100 parts by weight, wherein the mean molecular weights of A and A' differ by a factor of 2 to 20,
the shorter block A has a mean molecular weight of from 2,000 to 4,000 and
the blocks A and A' together account for from 35 to 50% by weight of b).

Special embodiments of the molding materials according to the subclaims and a process for their preparation have also been found.

The molding materials are described in detail below.

Component a

Component a is present in the novel molding materials in an amount from 20 to 80, preferably from 30 to 70, in particular from 35 to 60, parts by weight, based on the sum of the components a) to d).

They are compounds based on polyphenylene oxides disubstituted in the ortho-position, the ether oxygen of one unit being bonded to the benzene nucleus of the adjacent unit. The polyethers may carry hydrogen, halogen, hydrocarbons which do not possess any α-tertiary hydrogen atoms, halohydrocarbons, phenyl radicals and hydrocarbonoxy radicals in the ortho-position relative to the oxygen. Examples of suitable compounds are: poly-(2,6-dichloro-1,4-phenylene) ether, poly-(2,6-di-phenyl-1,4-phenylene) ether, poly-(2,6-dimethoxy-1,4-phenylene) ether, poly-(2,6-dimethyl-1,4-phenylene) ether, poly-(2,6-dimethyl-co-2,3,6-trimethyl-1,4-phenylene) ether and poly-(2,6-dibromo-1,4-phenylene) ether.

Poly-(2,6-dimethyl-1,4-phenylene) ether and poly(2,6-dimethyl-co-2,3,6-trimethyl-1,4-phenylene, ether are preferably used. Poly-(2,6-dimethyl-1,4-phenylene) ether is very particularly preferred. The viscosity number of the polyethers used is in general from 0.4 to 0.8, preferably from 0.5 to 0.7, dl/g, measured in chloroform at 30° C. according to DIN 53,726.

The aromatic polyethers can be prepared by autocondensation of the corresponding monohydric phenols by the action of oxygen in the presence of a catalyst system, as described in, for example, U.S. Pat. No. 3,219,625, 3,306,875, 3,956,442, 3,965,069 or 3,972,851.

Component b

The block copolymer b is used in the novel molding materials in an amount of from 1 to 20, preferably from 7 to 25, in particular from 7 to 15, parts by weight, based on the sum of a) to d). Block copolymers are known to be copolymers in which the different monomers are not incorporated randomly in the chain but in which homopolymeric chain segments (polymer blocks) of the various monomers are bonded to one another. In block copolymers having an asymmetric structure of the general formula A-B-A', the different homopolymeric chain segments A and A' of the same monomers are bonded to the homopolymeric chain segment B of a different monomer. Block copolymers having an asymmetric structure have been disclosed, for example in EP-A 26 916 or U.S. Pat. No. 4,091,053.

The block copolymers b consist of from 35 to 50, preferably from 35 to 40, % by weight of one or more vinylaromatic hydrocarbons, which form the blocks A and A', and from 50 to 65, preferably from 60 to 65, % by weight of one or more monomers which form the rubber block. The weight ratio of the monomers in the block copolymer can be determined by a conventional method, for example by oxidative degradation of the unhydrogenated block copolymers with osmium tetroxide and gravimetric analysis, by IR spectroscopy or by determining the refractive index.

The mean molecular weight of the block copolymer, which for the purposes of the present invention means the number average molecular weight, can be from 12,000 to 240,000, preferably 38,000 to 100,000, g/mole. It is determined by gel permeation chromatography, as described below.

According to the invention, the mean molecular weights of the blocks A and A' differ by a factor of from 2 to 20, preferably from 4 to 8. The shorter block A has a mean molecular weight of from 2,000 to 4,000, preferably from 3,000 to 3,800 g/mole. The mean molecular weights of the polymer blocks A and A' can be determined in a known manner by oxidative degradation of the unhydrogenated block copolymers A-B-A' with osmium tetroxide and evaluation of the gel permeation chromatograms.

The mean molecular weight of the block B is not critical over wide ranges. However, it has proven advantageous if B has a higher molecular weight than the longer block A'. The mean molecular weight of the polymer block B is obtainable, for example, by calculating the difference between the molecular weights of A and A' and the mean molecular weight of the block copolymer A-B-A'.

The polymer blocks A and A' may consist of vinylaromatic hydrocarbons, e.g. styrene, α-methylstyrene and styrenes which are alkylated in the nucleus, styrene being preferred. Conjugated dienes, which are particularly suitable for the elastomer block B, are butadiene, isoprene, 2,3-dimethylbutadiene, piperylene, or other anionically polymerizable conjugated $C_4$–$C_{12}$-dienes, 1,3-butadiene and isoprene being preferred. If such conjugated dienes are used, it has proven advantageous if from 35 to 55% by weight of these monomers are polymerized in the 1,2-configuration.

The block copolymers b can be prepared by a known method of anionic block polymerization by sequential addition of the monomers or by a coupling technique. Such processes are described in detail in, for example, U.S. Pat. Nos. 3,251,905, 3,390,207, 3,598,887 and 4,219,627. Suitable initiators for the polymerization are organo-alkali metal compounds, preferably lithium alkyls, such as methyllithium, ethyllithium, n-butyllithium, sec-butyllithium or isopropyllithium. n-Butyllithium or sec-butyllithium is particularly preferably used. Advantageous solvents for the polymerization are straight-chain or branched aliphatic hydrocarbons, e.g. n-octane or n-hexane, and unsubstituted or substituted cycloaliphatic and aromatic hydrocarbons, e.g. cyclohexane, methylcyclohexane or toluene, as well as any mixture of the aliphatic, cycloaliphatic and aromatic hydrocarbons. Cyclohexane is advantageously used as the solvent.

Other suitable solvent components are ethers, such as tetrahydrofuran or diethyl ether, and tertiary amines, e.g. tetramethylethylenediamine or pyridine, in concentrations of from 0.01 to 20, preferably from 0.01 to 2, % by weight. Tetrahydrofuran is preferred.

All starting materials must be freed from oxygen-active and proton-active impurities, which can be achieved, for example, by contact with organometallics or by adsorptive purification, for example over alumina. The polymerization is carried out under inert gas conditions at from $-20°$ to $+130°$ C., preferably from 25 to 80° C., under pressures at which the monomers and solvents do not vaporize at the polymerization temperature. When the polymerization is complete, a sufficient amount of water, methanol or isopropanol is added to the polymerization mixture in order to deactivate the active terminal groups and excess initiator.

In general, the procedure is as follows: in a first polymerization stage, the vinylaromatic hydrocarbon is completely polymerized to form the A or A' block, in the second polymerization step the diene hydrocarbon is completely reacted to form the B block, and in the third stage the second proportion of the vinylaromatic hydrocarbon is polymerized on to form A' and A blocks. This results in sharp transitions between the individual blocks.

The novel molding materials have particularly advantageous properties if, in the preparation of the block copolymer b, the smaller amount of the vinylaromatic monomer is used in the first polymerization stage for the formation of the A block and the larger amount of this monomer is used in the third step for the formation of the A' block.

The resulting block copolymers b having an asymmetric structure are converted by hydrogenation by a conventional process into polymers in which some of the aliphatic unsaturated bonds are saturated, ie. polymers which have a degree of hydrogenation of from 50 to 95% by weight. In the novel molding materials, block copolymers b are preferably used in which only from 5 to 20, in particular from 10 to 20, % by weight of the double bonds originally present are still present in the block B.

The hydrogenation is preferably carried out using molecular hydrogen and a catalyst based on a metal or metal salt of group 8 of the Periodic Table. It may be carried out in the heterogeneous phase, for example using Raney nickel, or preferably in the homogeneous phase using a catalyst based on a salt, in particular a carboxylate, alkoxide or enolate, of cobalt, of nickel or of iron, which is combined with a metal alkyl, in particular with aluminum alkyls. Processes for the selective hydrogenation of block copolymers are described, inter alia, in U.S. Pat. Nos. 3,113,986 and 4,226,952.

The polymer can be isolated by a known method, either by directly heating the polymerization mixture to dryness or by treating it with steam, the solvent being distilled off. It may also be precipitated in an excess of a nonsolvent, e.g. ethanol, and isolated mechanically and dried or worked up by devolatilization in an extruder.

For characterizing the block copolymer b, the following methods are used:

The mean molecular weights M (number average $M_n$) are measured by gel permeation chromatography using calibration curves for polystyrene (calibration substances having a very narrow molecular weight distribution: $M_w/M_n$ about 1) at 23° C. in 0.125% strength by weight tetrahydrofuran solution at a flow rate of 1.5 ml/min [cf. G. Glöckner, Polymercharakterisierung durch Flüssigkeitschromatographie, Verlag A. Hütig, Heidelberg, 1982].

The residual double bond content of the olefinically unsaturated bonds is determined by Fourier analysis of the infrared spectra. Component c From 0 to 70, preferably from 20 to 60, in particular from 33 to 50, parts by weight, based on the sum of a) to d), of component c are used in the molding materials according to the invention.

Both homopolymers and copolymers as well as toughened polymers of vinylaromatic compounds are used as component c.

Particularly suitable vinylaromatic compounds are styrene, as well as the styrenes which are alkylated in the nucleus or in the side chain. However, styrene alone is preferably used.

The homopolymers are prepared by a conventional bulk, solution or suspension polymerization process (cf. Ullmanns Enzyklopädie der techn. Chemie, Volume 19, pages 265-272, Verlag Chemie, Weinheim 1980). The homopolymers can have a weight average molecular weight $M_w$ of from 1,000 to 300,000, determined by a conventional method.

Examples of suitable comonomers for the preparation of copolymers are (meth)acrylic acid, alkyl (meth)acrylates where alkyl is of 1 to 4 carbon atoms, acrylonitrile and maleic anhydride as well as maleimide. Depending on their chemical structure, the comonomers are present in different amounts in the styrene polymers. The miscibility of the copolymer with the polyphenylene ether is a critical factor with regard to the content of comonomers in the copolymer. Such miscibility limits are known and are described in, for example, U.S. Pat. Nos. 4,360,618 and 4,405,753 and in the publication by J. R. Fried and G. A. Hanna, Polymer Eng. Scie. 22 (1982), 705 et seq. The copolymers are prepared by conventional processes, which are described in, for example, Ullmanns Encyklopädie der techn. Chemie, Volume 19, page 273 et seq, Verlag Chemie, Weinheim (1980). The copolymers generally have a weight average molecular weight ($M_w$) of from 10,000 to 300,000, determined by a conventional method.

The processes generally used for the preparation of toughened styrene polymers are bulk polymerization or solution polymerization in the presence of a rubber, as described in, for example, U.S. Pat. No. 2,694,692, and bulk/suspension polymerization processes, as described in, for example, U.S. Pat. No. 2,862,906. It is of course also possible to use other processes provided that the desired particle size of the rubber phase is obtained.

The rubbers used are the conventional natural or synthetic rubbers usually employed for toughening styrene polymers. For the purposes of the present invention, suitable rubbers in addition to natural rubber are, for example, polybutadiene, polyisoprene and copolymers of butadiene and/or isoprene with styrene and other comonomers which have a glass transition temperature of less than $-20°$ C., determined according to K. H. Illers and H. Breuer, Kolloidzeitschrift 190 (1) (1963), 16-34. However, acrylate rubbers and EPDM, polybutylene and polyoctenamer rubbers can also be used.

The toughened styrene polymers contain from 3 to 30, preferably from 4 to 14, % by weight of soft component. Component d The blends of polyphenylene ethers and the hydrogenated copolymers, which may also contain polyvinylaromatics, may furthermore contain assistants and additives, such as fire-retardant agents from the group consisting of the aromatic phosphates, phosphites and phosphine oxides, reinforcing agents, such as glass fibers, organic and mineral assistants and stabilizers, processing assistants, such as polyethylene wax, or dyes and the additives otherwise disclosed to date for the molding materials, as well as further polymers, such as polyamides, polyetherimides, polyacrylates, polyolefins and all other polymers disclosed as being compatible with polyethylene ethers. The molding materials may furthermore contain fillers, such as glass fibers, mineral fillers, clays, metal flakes, plasticizers and processing assistants as well as stabilizers and antistatics.

Component d is present in the novel molding materials in amounts of from 0 to 40 parts by weight, based on the sum of a) to d). Further description of the molding materials The novel thermoplastic molding materials are advantageously prepared by mixing the components at from 250° to 320° C. during a mean residence time of from 0.5 to 30, preferably from 1 to 5, minutes in a conventional mixing apparatus, for example a kneader or single-screw extruder, but preferably in a twin-screw extruder. In order to obtain a very homogeneous molding material, thorough mixing is necessary. The order in which the components are mixed may be varied; for example, two or more components can be premixed in a fluid mixer or all components can be mixed together in a single stage.

The molding materials according to the invention have good flow and are therefore readily processible and at the same time have good mechanical properties, including high impact strength and total penetration energy. This is all the more surprising since the novel molding materials which contain a block copolymer having a high content of more than 35% by weight of vinylaromatic compounds should, on the basis of previous assumptions, be less tough than the molding materials of DE-B 24 34 848, which contain rubber-like block copolymers having less than 33% by weight of vinylaromatics.

Another advantage of the novel molding materials is that their heat stability is high, i.e. the good mechanical properties deteriorate only slightly after prolonged storage at elevated temperatures. Even when flameproofing agents are incorporated, the advantageous properties are retained.

The novel thermoplastic molding materials can be converted to moldings having advantageous properties, in particular good impact strength and high heat stability, in an advantageous manner by injection molding or extrusion.

EXAMPLES 1 TO 9 AND COMPARATIVE EXPERIMENTS 1* TO 6*

Component a

Poly-(2,6-dimethyl-1,4-phenylene) ether having a viscosity number of 0.6 dl/g (measured in chloroform at 30° C. according to DIN 53,726), prepared according to the Examples of DE-A 30 35 599 and EP-A 81 708.

Component b

The block copolymers b stated in Table 2 were prepared according to the following general method:

7,000 g of purified, anhydrous cyclohexane, 35 g of tetrahydrofuran and monomeric styrene are initially taken in a thermostatable stirred kettle under very pure nitrogen, in order to form block A (amounts according to Table 1). After complete titration of the remaining proton-active impurities with sec-butyllithium, the amount of initiator, sec-butyllithium (1.4 molar solution in cyclohexane/isopentane), stated in Table 1 is added.

The temperatures during the polymerization are kept at from 45° to 65° C. for about 1 hour in order to form the first block of polystyrenelithium.

Thereafter, purified monomeric 1,3-butadiene (according to Table 1) is fed into the stirred kettle and polymerized at from 50° to 67° C. until complete conversion has taken place with formation of chains of two segments, polystyrene/polybutadienyllithium. The polymerization is complete after 1 hour. Further styrene (according to Table 1) is then added to form the third block A', whose polymerization is complete after about 1 hour at from 60° to 70° C. Thereafter, 15 ml of isopropanol are added in order to ensure termination of the living polymer chains.

After each polymerization stage, a sample is taken from the reaction vessel for analytical purposes.

The selective hydrogenation of the block copolymers is carried out by adding a catalyst solution of 1.4 g of nickel(II) acetylacetonate in 80 g of toluene, to which 30 ml of a 20% strength by weight solution of aluminumtriisobutyl in hexane has been added, under a hydrogen pressure of 15 bar and at a hydrogenation temperature of 80° C. The progressing hydrogenation reaction can be monitored via the consumption of hydrogen (pressure drop in the reactor).

Thus, under the chosen conditions, the residual double bond content after a hydrogenation time of 2½ hours ($=b_1$), after a hydrogenation time of 4 hours ($=b_2$) and after a hydrogenation time of 6 hours ($=b_3$) is 17% ($=b_1$), 14% ($=b_2$) and 11% ($=b_3$) of the olefinic unsaturation originally present.

The block copolymers are worked up by removing the solvent by devolatilization in an extruder.

TABLE 1

| | Amounts used | | | |
|---|---|---|---|---|
| | Styrene (A block) (g) | 1,3-butadiene (B block) (g) | Styrene (A' block) (g) | sec-butyl-lithium (mmol) |
| $b_1$ | 154 | 1875 | 971 | 44 |
| $b_2$ | 170 | 1920 | 910 | 45 |
| $b_3$ | 154 | 1860 | 986 | 43 |

TABLE 2

| | Component b | | |
|---|---|---|---|
| | Mean molecular weight M [g/mol] of A | $\frac{M (A')}{M (A)}$ | Content of A + A' in A—B—A' [% by wt.] |
| $b_1$ | 3,500 | 6.3 | 37 |
| $b_2$ | 3,800 | 5.3 | 36 |
| $b_3$ | 3,600 | 6.4 | 38 |

TABLE 3

| | Block copolymers not according to the invention | | | |
|---|---|---|---|---|
| | Structure[1] | Mean molecular weight M [g/mol] of A | $\frac{M (A')}{M (A)}$ | Content of A + A' [% by wt.] |
| V1 | A—B | 26,000 | — | 29 |
| V2[2] | A—B—A | 10,500 | 1 | 30 |
| V3 | A—B—A' | 9,000 | 1.7 | 32 |

[1] A, A': styrene block, B: block of partially hydrogenated polybutadiene
[2] According to DE-B 24 34 848

Table 4 lists the residual double bond contents of the block copolymers used.

TABLE 4

| | Residual double bond content [% by wt.] |
|---|---|
| b1 | 17 |
| b2 | 14 |
| b3 | 11 |
| V1 | 2 |
| V2 | 3 |
| V3 | 2 |

Component c c1: Polystyrene having a molecule weight of 150,000 g/mol (voscometric measurement in toluene at 25° C.), prepared according to S. R. Sundler and W. Karo, Polymer Syn. org. Chem. Vol. 29/I, Academic Press, N.Y., 1984, page 3 c2: High impact polystyrene having a polybutadiene content of 9% by weight, prepared according to DE-A 30 35 648 in the following manner:

An impact-resistant polystyrene having an average particle size of approximately 1 μm is prepared as follows:

A mixture of 7.2 parts by weight of a polybutadiene having a cis proportion of 98%, 87.5 parts by weight of styrene, 6 parts by weight of ethylbenzene and 0.1 part of octadecyl-3-(3',5'-di-tert-butyl-4'-hydroxyphenyl)-propionate was thermally polymerized in a 2-vessel-2-tower cascade. The throughput was 4 liters/hour. The stirrer speeds used in each reactor, the temperatures and the integral conversions which were set up are given below. 0.02 wt. % of tert-odecylmercaptan, based on styrene, was metered continuously into the polymer stream in the third reactor. After polymerization, the polymer mixture was freed from solvent and residual monomers in a devolatilization zone at from 220° to 240° C.

| Reactor | Stirrer speed (rpm) | Temp. (°C.) | Conversion (integral) |
|---|---|---|---|
| 1st stirred vessel | 100 | 104 | 3.8 |
| 2nd stirred vessel | 160 | 132 | 20.3 |
| 1st tower | 15 | 101 | 55.3 |
| 2nd tower | 3 | 127 | 84.3 |
| Devolatilization | — | 250 | — | c3: High impact polystyrene having a polybutadiene content of 8% by weight, prepared according to DE-A 30 35 648 in the following manner:

An impact-resistant polystyrene having an average particle size of from 2 to 3 μm was prepared as follows:

A solution of 1283 g of styrene, 112 g of polybutadiene (1,2-vinyl content: approximately 9 wt. %), 1.5 g of t-dodecylmercaptan, 1.5 g of octadecyl-3-(3',5'-di-tert-butyl-4'-hydroxyphenyl)-propionate and 1.6 g of dicumyl peroxide was prepolymerized, in a 4-liter vessel equipped with a blade stirrer, at an internal temperature of 110° C. and a stirrer speed of 300 rpm to a solids content of 25.4 wt. %. Subsequently, 1,800 ml of water containing 9 g of polyvinylpyrrolidone having a K value of 90 and 1.8 g of $Na_4P_2O_7$ were added and the stirrer speed was increased to 300 rpm. The mixture was polymerized up to a styrene conversion in excess of 99% by afterpolymerization for 3 hours at 100° C., 3 hours at 120° C. and 4 hours at 140° C.

Component d d1: Triphenylphosphine oxide d2: Ethylene/but-1-ene copolymer having a but-1-ene content of 8% by weight, a density of 0.919 g/cm$^3$ and a melt flow index of 1 g/10 min at 190° C. and under a load of 21.6 kg.

d3: Trisnonylphenyl phosphite d4: Finely divided mineral clay (Kaolin Supreme from Bassermann, Munich, having a median particle diameter (d$_{50}$) of 0.4 μm and a BET specific surface area of 14 m$^2$).

The parts by weight, stated in Table b 5, of components a, b and c and of additives d were mixed with one another in a fluid mixer, and the mixture was melted and homogenized in a twin-screw extruder at 280° C. in the course of 3 minutes. The mixture was then granulated.

TABLE 5

| | | Molding materials | | | |
|---|---|---|---|---|---|
| | Comparative | Components, amount in kg | | | |
| Example | Experiment | a | b | c | d |
| 1 | | 4.0 | 1.0 (b1) | 4.8 (c2) | 0.1 (d2) 0.1 (d3) |
| 2 | | 4.0 | 1.0 (b2) | 4.8 (c2) | 0.1 (d2) 0.1 (d3) |
| 3 | | 4.0 | 1.0 (b3) | 4.8 (c2) | 0.1 (d2) 0.1 (d3) |
| 4 | | 4.5 | 0.9 (b1) | 4.0 (c3) | 0.5 (d1 0.1 (d2) |
| 5 | | 4.5 | 0.9 (b2) | 4.0 (c3) | 0.5 (d1) 0.1 (d2) |
| 6 | | 5.7 | 1.0 (b1) | | 1.0 (d1) 2.3 (d4) |
| 7 | | 5.7 | 1.0 (b2) | | 1.0 (d1) 2.3 (d4) |
| 8 | | 5.0 | 1.2 (b1) | 3.6 (c1) | 0.1 (d2) 0.1 (d3) |
| 9 | | 5.0 | 1.2 (b2) | 3.6 (c1) | 0.1 (d2) 0.1 (d3) |
| | 1* | 4.0 | 1.0 (V1) | 4.8 (c2) | 0.1 (d2) 0.1 (d3) |
| | 2* | 4.0 | 1.0 (V2) | 4.8 (c2) | 0.1 (d2) 0.1 (d3) |
| | 3* | 4.0 | 1.0 (V3) | 4.8 (c2) | 0.1 (d2) 0.1 (d3) |
| | 4* | 4.5 | 0.9 (V3) | 4.0 (c1) | 0.5 (d1) 0.1 (d2) |
| | 5* | 5.7 | 1.0 (V3) | | 1.0 (d1) 2.3 (d4) |
| | 6* | 5.0 | 1.2 (V3) | 3.6 (c1) | 0.1 (d2) 0.1 (d3) |

Testing of the molding materials was carried out on test specimens injection molded at 280° C. The total penetration energy according to DIn 53,443, Page 2 at 23° C. and −40° C. and the notched impact strength according to DIN 53,453 at 23° C. and −20° C. were measured. To determine the heat stabilizy, the test specimens were subjected to thermal aging at 90° C. in a through-circulation oven. After the time intervals stated in Table 5, the notched impact strength according to DIN 53,453 at 20° C. and −20° C. was measured. The flow was determined from the melt flow index according to DIn 53,735. The results of the test are shown in Table 6.

TABLE 6

| | | Properties | | | | | | | |
|---|---|---|---|---|---|---|---|---|---|
| | | Melt flow index (21.6 kg, 250° C.) [g/10 min] | Total penetration energy [Nm] | | Notched impact strength [kJ/m$^2$] | | | | |
| | | | | | immediately | | after storage at 90° C. | | | |
| | | | | | | | 15 weeks | | 30 weeks | |
| Example | Comparative Experiments | | 23° C. | −40° C. | 23° C. | −20° C. | 23° C. | −20° C. | 23° C. | −20° C. |
| 1 | | 40 | 50 | 35 | 24 | 16 | 21 | 13 | 18 | 11 |
| 2 | | 42 | 45 | 31 | 26 | 15 | 22 | 14 | 16 | 10 |
| 3 | | 45 | 40 | 25 | 25 | 14 | 18 | 11 | 14 | 8 |
| 4 | | 81 | 48 | 17 | 18 | 12 | 17 | 10 | 13 | 7 |
| 5 | | 78 | 45 | 18 | 19 | 11 | 15 | 9 | 12 | 6 |
| 6 | | 7 | 40 | 25 | 12 | 7 | 11 | 6 | 10 | 4 |
| 7 | | 8 | 38 | 23 | 11 | 6 | 10 | 7 | 9 | 5 |
| 8 | | 80 | 48 | 30 | 16 | 11 | 14 | 10 | 11 | 8 |
| 9 | | 88 | 45 | 28 | 18 | 10 | 17 | 8 | 12 | 7 |
| | 1* | 38 | 28 | 5 | 22 | 7 | 14 | 5 | 8 | 2 |
| | 2* | 30 | 45 | 20 | 21 | 12 | 15 | 9 | 12 | 7 |
| | 3* | 32 | 48 | 21 | 22 | 10 | 13 | 10 | 11 | 7 |
| | 4* | 65 | 42 | 13 | 14 | 10 | 10 | 8 | 10 | 3 |
| | 5* | 5 | 30 | 18 | 9 | 6 | 6 | 4 | 4 | 2 |
| | 6* | 63 | 40 | 22 | 14 | 8 | 10 | 6 | 7 | 2 |

We claim:

1. A thermoplastic molding material, containing:
   a) from 20 to 80 parts by weight of a polyphenylene ether having a viscosity number of from 0.4 to 0.8 dl/g;
   b) from 1 to 20 parts by weight of an unsymmetrical block copolymer of the formula A-B-A$^1$ consisting of two polyvinylaromatic blocks A and A$^1$ and a partially hydrogenated rubber block B;
   c) from 20 to 60 parts by weight of a high impact polystyrene; and
   d) a measurable quantity of trisononylphenyl phosphite; the sum of a) to d) being 100 parts by weight, wherein
   the mean molecular weights of A and A$^1$ differ by a factor of from 2 to 20,
   the shorter block, A, has a mean molecular weight of from 2,000 to 4,000, and
   the blocks A and A$^1$ together account for from 35 to 50% by weight of (b).

2. A thermoplastic molding material as defined in claim 1, wherein the blocks A and A' together account for from 35 to 40% by weight of the block copolymer.

3. A thermoplastic molding material as defined in claim 1, wherein the mean molecular weights of A and A' differ by a factor of from 4 to 8.

4. A thermoplastic molding material as defined in claim 1, wherein A has a mean molecular weight of from 3,000 to 3,800.

5. A thermoplastic molding material as defined in claim 1, wherein, in block B of the block copolymer b, from 10 to 20% by weight of the double bonds originally present are still present.

6. A process for the preparation of a thermoplastic molding material as defined in claim 1 by mixing at from 250° to 320° C. in the course of from 0.5 to 30 minutes.

* * * * *

UNITED STATES PATENT AND TRADEMARK OFFICE
CERTIFICATE OF CORRECTION

PATENT NO. : 5,059,645

DATED : October 22, 1991

INVENTOR(S) : Bertram OSTERMAYER et al.

It is certified that error appears in the above-identified patent and that said Letters Patent is hereby corrected as shown below:

Claim 1, Column 10, Line 44

That part reading "trisononylphenyl" should read --trisnonylphenyl--

Signed and Sealed this

Sixth Day of April, 1993

Attest:

STEPHEN G. KUNIN

Attesting Officer

Acting Commissioner of Patents and Trademarks